United States Patent [19]

Schonfeld et al.

[11] 3,980,595

[45] Sept. 14, 1976

[54] POLYURETHANE ELASTOMERS MODIFIED WITH HYDROCARBON RUBBER

[75] Inventors: Steven E. Schonfeld; William L. Hergenrother; Byron H. Werner, all of Akron, Ohio

[73] Assignee: The Firestone Tire & Rubber Company, Akron, Ohio

[22] Filed: Nov. 14, 1974

[21] Appl. No.: 523,940

Related U.S. Application Data

[63] Continuation-in-part of Ser. No. 335,612, Feb. 26, 1973, abandoned.

[52] U.S. Cl. ................................ 260/3; 156/110 R; 156/123 H; 156/128 T; 260/859 R
[51] Int. Cl.² .................... B29H 17/22; C08L 7/00; C08L 75/04
[58] Field of Search ............ 260/3, 859; 156/128 T, 156/110 R, 123 R

[56] References Cited

UNITED STATES PATENTS

| | | | |
|---|---|---|---|
| 3,219,633 | 11/1965 | Boussu et al. | 260/75 |
| 3,225,007 | 12/1965 | Gruber et al. | 260/75 |
| 3,514,499 | 5/1970 | Schollenberger et al. | 260/3 |
| 3,562,355 | 2/1971 | Holden | 260/859 R |
| 3,652,468 | 3/1972 | Schwab et al. | 260/859 |

*Primary Examiner*—J. Ziegler

[57] ABSTRACT

There is provided a modified polyurethane elastomer composition characterized by the presence therein of a substantial proportion in the range of from 5% to 35% by weight of the urethane of a nonfunctional hydrocarbon rubber, together with a curing agent for the urethane and a separate and distinct curing agent for the hydrocarbon rubber. Principal purposes of the present invention include the production of high strength castable elastomers which are nonmelting under conditions of high shear.

18 Claims, No Drawings

POLYURETHANE ELASTOMERS MODIFIED WITH HYDROCARBON RUBBER

This application is a continuation-in-part of applicant's co-pending application Ser. No. 335,612, filed Feb. 26, 1973, now abandoned.

BACKGROUND OF THE INVENTION AND PRIOR ART

Heretofore the prior art has suggested the use of elastomeric polyurethane as suitable materials for the manufacture of cast solid and pneumatic tires. The long chain polyurethane polymers useful in accordance with the prior art and useful in accordance with the present invention are linear urethane rubbery polymers prepared by reacting a generally linear polyester or polyether, or a combination of these materials, with one or more organic diisocyanates, usually an aromatic diisocyanate such as toluene diisocyanate. Reference may be had to the U.S. Pat. No. to Gruber et al 3,225,007 which discloses polyurethanes of the type useful in accordance with the present invention and their use in the manufacture of cast articles.

It has been found that with cast articles formed from linear polyurethanes of the polyether, polyester, or mixed polyether-polyester types, when such articles are submitted to high shear conditions, there is a tendency for the polymer to melt and become slippery. The risks involved in utilization of such materials in automotive vehicle tires, for example, are evident.

It has been found that linear elastomeric polyurethanes may be improved in respect of this and other properties by dispersing into the polyurethane matrix from 5 to 35% by weight of a nonfunctional hydrocarbon rubber together with a curing agent for the polyurethane and a curing agent for the hydrocarbon rubber.

Blends of reactive or functional rubbers with polyurethanes have been prepared prior to this time with the hydrocarbon rubber component being in the major amount (see U.S. Pat. No. 3,514,499; the U.S. Pat. No. to Verdol et al 3,427,366; the U.S. Pat. No. to Massoubre 3,429,948; and the U.S. Pat. No. to Holden 3,562,355, wherein the hydrocarbon rubber and the polyurethane are block copolymerized).

The U.S. Pat. No. to Schollenberger 3,514,499 teaches that when sulfur vulcanizable unsaturated elastomer compounds containing sulfur and an accelerator also contain small amounts of poly(etherurethanes), that the cure time is effectively reduced without apparent adverse consequences on the resulting vulcanizates.

According to Verdol U.S. Pat. No. 3,427,366, general purpose elastomers, especially the ethylene-propylene rubbers, show increased "tack" when modified with urethane elastomers. This is said to be of important commercial significance since one of the major shortcomings of commercially available ethylene-propylene terpolymer rubbers is their inherent lack of tack. It is pointed out in this reference that the polydiene materials have at least 2.1 hydroxyls per molecule which allows cross-linking by means of urethane linkages when a suitable amount of diisocyanate is employed in the reaction. The resultant materials are complex polyolefin-polyurethane rubbers. The present invention contemplates the use of nonreactive hydrocarbon rubbers.

The U.S. Pat. No. to Holden 3,562,355 is concerned with compositions which demonstrate flex cracking resistance and improved resistance to solvent action and ozone comprising a block copolymer together with one or more of three classes of auxiliary polymers; namely, a linear polyester urethane, copolymers of ethylene with esters of terminally ethylenically-unsaturated monocarboxylic acids and saturated aliphatic alcohols and esters of saturated monocarboxylic acids and terminally ethylenically unsaturated aliphatic alcohols. The block copolymers in accordance with the Holden patent are of the general configuration $[A-B-A]_n$ wherein n is a whole integer between 1 and 5. If the copolymer is not hydrogenated, the blocks A comprise poly(monovinyl arene) blocks while the block B is a poly(conjugated diene) block. Specific examples of such block copolymers are those having the block configuration of polystyrene-polybutadiene-polystyrene and polystyrene-polyisoprene-polystyrene. The present invention does not contemplate the use of such block copolymers.

The present invention is clearly distinguished from the prior art in that it contemplates a blend of a linear elastomeric polyurethane with a minor amount of a hydrocarbon rubber together with a curing agent for the polyurethane usually a hydroxyl or amino compound, or an amino-alcohol, and a curing agent for the rubber compound, usually a peroxide or sulfur, and wherein the dispersion is of finely divided carbon rubber material in a matrix of polyurethane material, the particle size of the hydrocarbon rubber material being in the submicron range.

Such blends as distinct from copolymers, interreaction products, or block polymers are characterized in that they demonstrate nonmelting properties under conditions of high shear, low hardness, good tear strength, and high modulus. By this invention, therefore, a nonfunctional hydrocarbon rubber can be used to reinforce the physical properties of a polyurethane. Moreover, by being nonfunctional, the hydrocarbon rubber material does not interfere with the apparent pot life of the polyurethane composition. In addition, the presence of the hydrocarbon rubber material both lowers the per pound cost of the formulation and allows cross-linking to be introduced into the system by the use of a peroxide or other hydrocarbon rubber curing agent with no serious degradation of most polyurethane backbones which occur in the cured product.

The only known disadvantage of the invention is that it is difficult to use a peroxide as the curing agent in a polybutadiene blend in a polypropylene oxide/glycol-based polyurethane system because the peroxide tends to degrade the polypropylene oxide backbone. This behavior seems to be specific to the particular polypropylene oxide/glycol-based polyurethanes.

BRIEF DESCRIPTION OF THE INVENTION

Briefly stated, the present invention is in a modified linear polyurethane elastomer composition comprising in combination an isocyanate terminated linear polyether, linear polyester, or linear polyether-polyester prepolymer having a molecular weight in the range of from 500 to 5000 and an -NCO content of from 1% to 10% by weight, said prepolymer having dispersed therein from 5% to 35% by weight of the modified elastomer composition of a nonfunctional hydrocarbon rubber having a molecular weight in the range of from 20,000 to 300,000, an isocyanate curing agent for said prepolymer, said curing agent being present in a molar ratio of $XH_n/NCO$ wherein X is oxygen or nitrogen and n is 1 or 2, said ratio being in the range of from 1.0 to 1.2 and from 1 to 50 parts by weight of the hydrocarbon rubber of a separate and different rubber curing agent.

DETAILED DESCRIPTION OF THE INVENTION AND SPECIFIC EXAMPLES

Polyurethane elastomers have recently become of interest in the vehicle tire field as indicated above. However, the high shear properties of this material otherwise unmodified are such that the polymer tends to break down or degrade to a liquid film at the shear interface. This tendency is readily demonstrated by applying a sample to a grinding wheel with sufficient pressure to abrade the surface. The presence or absence of molten material is noted. In the case of a vehicle tire, such degradation could lead to dangerous skidding. The present invention overcomes this problem by blending with the urethane elastomer a limited amount of a nonfunctional hydrocarbon rubber additive. In addition to overcoming the "shear-melt" problems which have heretofore characterized polyurethane materials in tire applications, the compositions of the present invention also enable liquid fabricating techniques such as centrifugal casting, liquid injection molding and liquid transfer molding.

The polyurethane moiety of the present composition comprises a conventional elastomeric polyurethane material present in the modified composition in the range of from about 95% to about 65% by weight. Representative examples of such polyurethane materials as are useful herein are fully disclosed in the aforesaid U.S. Pat. No. to Gruber et al 3,225,007 and the U.S. Pat. No. to Boussu et al 3,219,633. The disclosures of these references are hereby incorporated by reference.

Generally, the elastomeric polyurethane materials are polyesters or polyether based materials terminated with isocyanate groups as by known reactions with isocyanate compounds, typical examples of commercially available diisocyanates being those listed in Column 5 of U.S. Pat. No. 3,225,007. A particularly suitable diisocyanate is toluene diisocyanate. As indicated above, with the propylene ether derivatives, there is some susceptibility to peroxides which might otherwise be used for the curing of the nonfunctional hydrocarbon rubber moiety. Thus, peroxide curing agents are contra-indicated when polyester or polyether urethanes based on propylene ether derivatives are used. In general, the physical properties of the polyurethane component are dictated by the end uses of the composition. The NCO contents of the prepolymers of these elastomers is generally in the range of from 1% to 10% by weight with the preferred range being from 2% to 7% by weight. The molecular weight of the prepolymer compositions is from 500 to 5,000.

The second principal component of these compositions is a curable, natural or synthetic hydrocarbon rubber material free of functionality other than unsaturation. Specific examples include polybutadiene, polyisoprene, styrene/butadiene copolymers, and the like. Other representative examples of nonfunctional hydrocarbon rubbers useful in accordance herewith include natural rubber, copolymers of isobutylene and isoprene, ethylene propylene rubbers, ethylene propylene diene elastomers (1,6-hexandiene being representative). These hydrocarbon polymers contain at least about 1% olefinic unsaturation and are preferably lithium free. These hydrocarbon rubber elastomers are all curable with sulfur or a peroxide. When compositions in accordance with the principles of this invention were tried with a butadiene/acrylonitrile copolymer, the invention was found not to work. The problem appeared to be more in the nature of a compounding problem rather than a chemical problem. The preferred polyurethane materials appear to be a poly(tetrahydrofuran) toluene diisocyanate ended or a poly(caprolactone) toluene diisocyanate ended. The preferred hydrocarbon rubber component is polybutadiene. The rubber components have molecular weights in the range of from 20,000 to 300,000. The preferred polybutadiene material may be formed from 1,2-butadiene or 1,4-butadiene or a mixture of the two. Again, the selection of the hydrocarbon rubber material depends upon the end properties desired.

The hydrocarbon rubber material is present on a weight basis with respect to the modified polyurethane material in the preferred range of 5% to 35% in order to assure the provision of a modified polyurethane elastomer which is melt-free under abrasive or high shear conditions. The melt-free characteristics of the modified polyurethane elastomer are not uniformly observed below the 5% by weight level of hydrocarbon rubber. Similarly, the urethane attributes of the modified elastomer are not obtained when the hydrocarbon rubber moiety present is materially increased beyond the 35% by weight level.

As indicated above, the third and fourth essential components of the present invention are curing agents for the respective polymeric materials. The basic polymeric materials exist separately and are cured individually by their respective types of curing agents. In both cases, the curative agents employed are those which are commonly employed when the materials are used individually. Thus, the cure agents for the polyurethane materials are generally of the diamine, diol, or amino alcohol types. These are conventional urethane curatives and are used in an amount corresponding to the amount of free isocyanate in the composition. The quantity of cure agent base is based on the amount of NCO present which varies from 1.0 to 1.2 $NH_2/NCO$ or $OH/NCO$ ratio. A specific example of a curing agent for polyurethanes is methylene bis(ortho-chloroaniline) (MOCA).

As illustrated by the subsequent examples, the curing agent for the polyurethane moiety is a linear extending agent in that the proportion thereof is selected to provide a linear polyurethane structure. In tire applications, the preferred ratio of $NH_2/NCO$ or $OH/NCO$ varies from 1.0 to 1.2 in order to assure a linear structure and the desired physical properties, and a 1.05 ratio has been found to be particularly satisfactory.

The cure agents for the nonfunctional hydrocarbon rubber material are also conventional for such materials. Generally, these materials are sulfur, radiation, or known organic peroxide materials which will cross-link rubber. Where a chemical curative for the nonfunctional hydrocarbon rubber component is contemplated, this agent is added in an amount which is conventional for curing such a rubber. The peroxide is added to the blend after removal of the hydrocarbon solvent and in an amount ranging from 0.01 to 50 parts by weight per 100 parts of rubber.

The hydrocarbon rubber component of the present invention is utilized as a rubber cement; that is, a solution or dispersion in a hydrocarbon solvent, for example hexane. The polyurethane prepolymer and the cement are physically mixed and the solvent slowly removed by conventional means, e.g. vacuum, with high speed agitation, thereby forming a fine particle size (<300 micron average diameter) dispersion of the rubber in the prepolymer. In general, the particle size of the hydrocarbon rubber component in the prepolymer ranges from solution to about 300 microns. This dispersion, while not indefinitely stable, may be held at room temperature for reasonable periods of time at this stage. At this point, the curing agent for the hydrocarbon rubber component may be added; and, thereafter, the polyurethane moiety is submitted to a curing treatment. The curative agent for the polyurethane may be added at any temperature within the range of from room temperature to 120°C., although the individual curative agent used will determine where within this range addition is best made. Upon completion of the addition of the curing agents to the dispersion of elastomeric materials, the material may be placed in a mold or submitted to injection molding treatment. The polyurethane moiety is cured at a temperature in the range of from 80° to 150°C. Depending upon the temperature of cure of the polyurethane, the hydrocarbon rubber is cured either simultaneously or subsequently thereto with the previously added curative agent therefor under conditions which promote curing by such agent. If radiation is the means by which the hydrocarbon rubber moiety is cured, it is accomplished by a postcure irradiation procedure.

It becomes convenient at this point to illustrate the invention in greater detail by giving illustrative examples. It will be understood that these examples are for illustrative purposes only and that those skilled in the art will be enabled thereby to reproduce numerous examples in accordance with the foregoing teachings. In the following examples the formulation quantities are in parts by weight, unless otherwise stated.

In general, test samples are poured into test strip molds known in the art and cured at temperatures and times long enough to go through 8 to 10 half lives of the peroxide used and long enough to assure a complete polyurethane cure. Conventional strength testing was then conducted on the samples.

EXAMPLES 1 and 2

| Formulation | | Control (1) | (2) |
|---|---|---|---|
| (a) | Poly(tetramethylene glycol)/toluene diisocyanate prepolymer (MW 2000) | 100 | 100 |
| (b) | Poly(1,4-butadiene) rubber as 24% total solids in hexane | 0 | 20 |
| (c) | 2,5-dimethyl-2,5-di(t-butyl-peroxy) hexane | 0 | 0.3 |
| (d) | Ethanolamine | 2.3 | 2.3 |

The urethane prepolymer (a) and the hydrocarbon rubber cement (b) were thoroughly mixed and degassed under vacuum with stirring and heat for 4 hours at 30° – 65°C. and the hexane distilled off. The rubber curing catalyst (c) was then added and blended in, followed by the urethane curing catalyst (d). The resultant composition was poured into a test strip mold and cured for 2 hours at 150°C.

The properties obtained were as follows:

| | | | |
|---|---|---|---|
| Shore A | | 70 | 71 |
| R. T. Tensile (psi) | | 2250 | 2200 |
| Elongation % | | 380 | 400 |
| Modulus: | 5% | 61 | 56.7 |
| | 100% | 300 | 400 |
| | 300% | 1200 | 1675 |
| 212°F. Tensile (psi) | | 430 | 740 |
| Elongation % | | 160 | 310 |
| Modulus: | 100% | 370 | 240 |
| | 300% | — | 710 |
| Crescent tear: | R. T. (lbs/linear in.) | 210 | 260 |
| | 212°F. | 63 | 102 |
| % Rebound: | R. T. | 59 | 54 |
| | 212°F. | 64 | 55 |
| YMI, °C.[1] | | −60 | −57 |

[1]Temperature at which Young's Modulus equals 10,000 psi.

From the foregoing results, the hydrocarbon rubber component (b) has resulted in an improvement in the tear resistance, particularly at elevated temperature, as well as having shown some modulus reinforcement to the stock when compared to a control. The rubber appears to be a fine dispersion in a polyurethane matrix.

EXAMPLES 3 and 4

| Formulation: | | (3) | (4) |
|---|---|---|---|
| (a) | Poly(tetramethylene glycol)/toluene diisocyanate prepolymer (MW 2000) | 100 | 100 |
| (b) | Poly(1,2-butadiene) 93%, balance poly-(1,4-butadiene); 0.37 dilute solution viscosity in hexane (1/2%) used as 71% solution in hexane | 20 | 40 |
| NH$_2$/NCO | | 1.05 | 1.05 |
| (c) | 2,5-dimethyl-2,5-di(t-butylperoxy) hexane | 0.625 | 0.625 |
| (d) | Methylene bis(0-chloroaniline) | 12.8 | 12.8 |

The procedure for making the blends was as in Example 2 above.

The properties obtained were as follows:

| | | | |
|---|---|---|---|
| Shore A | | 76 | 84 |
| R. T. Tensile (psi) | | 2430 | 1225 |
| Elongation % | | 615 | 490 |
| Modulus: | 5% | 172 | 240 |
| | 100% | 625 | 825 |
| | 300% | 1050 | 1100 |

| | | | |
|---|---|---|---|
| 212°F. Tensile (psi) | | 629 | 650 |
| Elongation % | | 190 | 223 |
| Modulus: | 100% | 321 | 543 |
| Crescent tear: | R. T. | 272 | 339 |
| | 212°F. | 126 | 184 |
| % Rebound: | R. T. | 49 | 48 |
| | 212°F. | 58 | 53 |
| YMI°C. | | −41 | −23 |

Again, there is noted an improvement in the tear resistance and modulus reinforcement compared to the control, Example 1. Additional rubber seems to decrease tensile, but improve the modulus.

EXAMPLES 5 - 8

| Formulation: | | (5) | (6) | (7) | (8) |
|---|---|---|---|---|---|
| (a) | Poly(tetramethylene glycol)/toluene diisocyanate prepolymer (MW 2000) | 100 | 100 | 100 | 100 |
| (b) | Poly(1,2-butadiene) rubber as 56% solution in hexane | 20 | 20 | 20 | 20 |
| (c) | Hydroxyl ended poly-(butadiene) | 20 | 20 | 20 | 20 |
| (d) | 2,5-dimethyl-2,5-di-(t-butyl-peroxy) hexane | 0.24 | 0.47 | 1.875 | 3.0 |
| NH$_2$/NCO ratio | | 1.05 | 1.05 | 1.05 | 1.05 |
| (e) | Methylene bis (o-chloroaniline) | 29.3 | 29.3 | 29.3 | 29.3 |

Ingredients (a), (b), and (c) were blended initially and the procedure from that point on is as in Example 2.

The properties obtained were as follows:

| | | (5) | (6) | (7) | (8) |
|---|---|---|---|---|---|
| Shore A | | 71 | 78 | 84 | 83 |
| R. T. Tensile (psi) | | 2125 | 1650 | 1825 | 1900 |
| Elongation % | | 575 | 390 | 215 | 170 |
| Modulus: | 5% | 118 | 150 | 260 | 241 |
| | 100% | 525 | 675 | 1075 | 1275 |
| | 300% | 1150 | 1425 | — | — |
| 212°F. Tensile (psi) | | 710 | 720 | 707 | 713 |
| Elongation % | | 273 | 207 | 100 | 77 |
| Modulus: | 100% | 460 | 527 | 707 | — |
| Crescent Tear: | R. T. | 207 | 261 | 271 | 250 |
| | 212°F. | 111 | 96 | 103 | 83 |
| % Rebound | R. T. | 46 | 54 | 49 | 48 |
| | 212°F. | 66 | 64 | 64 | 64 |
| YMI, °C. | | −34 | −38 | −31 | −21 |

The foregoing Examples 5 – 8 show the effect of addition of a reactive rubber, (c), and increasing amounts of hydrocarbon rubber curing agent (d).

EXAMPLES 9 - 13

| Formulation: | | (9) | (10) | (11) | (12) | (13) |
|---|---|---|---|---|---|---|
| (a) | Poly(tetramethylene glycol)/toluene diisocyanate prepolymer (MW 2000) | 100 | 100 | 100 | 100 | 100 |
| (b) | Poly(1,4-butadiene) 25% hex. | — | 25 | 25 | 37.5 | 37.5 |
| | MW (b) | — | 20,000 | 20,000 | 20,000 | 101,000 |
| (c) | Dioctyl phthalate | 25 | 0 | 0 | 0 | 0 |
| (d) | 2,5-dimethyl-2,5-(t-butyl-peroxy) hexane | 0 | 0 | 0.9 | 0.6 | 0.6 |
| (e) | Methylene bis-(o-chloroaniline) | 12.4 | 12.4 | 12.4 | 12.4 | 12.4 |
| % NCO in prepolymer | | 3.82 | 3.82 | 3.82 | 3.82 | 3.82 |

The procedure for forming the blends and casting test strips was the same as in Example 2.

The properties obtained were as follows:

| | | (9) | (10) | (11) | (12) | (13) |
|---|---|---|---|---|---|---|
| Shore A | | 62 | 65 | 70 | 66 | 65 |
| R. T. Tensile (psi) | | 2475 | 2025 | 1525 | 1725 | 2300 |
| Elng. % | | 800 | 830 | 340 | 420 | 430 |
| Modulus | 5% | 73 | 87 | 112 | 81 | 77 |
| | 100% | 225 | 375 | 500 | 375 | 400 |
| | 300% | 325 | 550 | 1375 | 1250 | 1050 |
| 212°F. Tensile (psi) | | 1100 | 250 | 700 | 635 | 600 |
| Elong. % | | 1105 | 100 | 170 | 200 | 205 |
| Modulus | 100% | 350 | — | — | — | — |
| Crescent tear: | R.T. | 173 | 179 | 163 | 147 | 167 |
| | 212°F | 129 | 78 | 80 | 87 | 102 |
| YMI °C | | −43 | −33 | −47 | −54 | −48 |
| Melt behavior | | melts | melts | nonmelt | nonmelt | nonmelt |

Examples 9 and 10 are controls; Example 9 is a DOP plasticized material while Example 10 is poly(1,2-butadiene) (uncured) plasticized. Both controls have poor hot (212°F.) properties, especially Example 10. Both Examples 9 and 10 are very prone to melting when abraded against a grinding wheel. Examples 11 – 13 are peroxide cured poly(butadiene) along with MOCA cured polyurethane. None of Examples 11 – 13 melts in the grinding wheel test.

EXAMPLES 14 - 17

| Formulation: | | (14) | (15) | (16) | (17) |
|---|---|---|---|---|---|
| (a) | Urethane of Examp. 2 | 100 | 100 | 100 | 100 |
| (b) | Poly(butadiene) of Examp. 2 (MW 20,000) | 35 | 35 | 35 | 35 |
| (c) | Rubber curing agent of Examp. 2 | 0.9 | 0.9 | 0.9 | 0.9 |
| | Prepolymer % NCO | 2.79 | 3.17 | 3.50 | 3.87 |
| (d) | % theoretical MOCA to cure | 102.5 | 102.5 | 102.5 | 102.5 |

Blending and sample casting is conducted in the same manner as Example 2.

The properties obtained were as follows:

| | | | | |
|---|---|---|---|---|
| Shore A | 66 | 68 | 71 | 73 |
| R. T. Tensile (psi) | 1725 | 1740 | 2300 | 1800 |
| Elongation % | 420 | 390 | 455 | 385 |
| Modulus: 5% | 81 | 89 | 105 | 124 |
| 100% | 375 | 425 | 475 | 600 |
| 300 | 1250 | 1100 | 1000 | 1800 |
| 212°F. Tensile (psi) | 635 | 550 | 700 | 695 |
| Elongation % | 200 | 180 | 305 | 165 |
| Modulus: 100% | 425 | 425 | 375 | 560 |
| Crescent tear: R. T. | 147 | 177 | 203 | 261 |
| 212°F. | 87 | 91 | 134 | 175 |
| YMI, °C. | −48 | −50 | −42 | −35 |
| Melt behavior | non-melt | non-melt | non-melt | non-melt |

These Examples 14 – 17 show excellent properties at elevated temperatures and do not melt upon severe abrasion against a grinding wheel.

Conventional rubber formulation ingredients may also be included in these compositions at their normal concentration levels. For example, reinforcing pigments such as carbon black and finely divided silica may be included if desired.

What is claimed is:

1. A liquid castable modified polyurethane elastomer composition consisting essentially of:
   A. from about 95% to about 65% by weight of said modified polyurethane elastomer composition of a polyurethane formable from;
      a. an isocyanate terminated linear polyether or linear polyester prepolymer having a molecular weight in the range of from 500 to 5000 and an NCO content of from 1% to 10% by weight; and
      b. a linear extending, curing agent for said prepolymer, said curing agent being present in a molar ratio of $XH_n$/NCO wherein X is oxygen or nitrogen and n is 1 or 2 in the range of from about 1.0 to about 1.2;
   B. from about 5% to about 35% by weight of said modified polyurethane elastomer composition of a rubber material dispersed in said prepolymer and isocyanate curing agent therefor, said rubber material being formable from;
      a. a hydrocarbon rubber free of functionality other than unsaturation and having a molecular weight in the range of from 20,000 to 300,000; and
      b. from 0.01 to 50 parts by weight of the hydrocarbon rubber of a separate and different rubber curing agent for said hydrocarbon rubber;
   C. said modified polyurethane elastomer composition being liquid castable and, upon curing said modified polyurethane elastomer composition, said hydrocarbon rubber being present in the matrix of the linearly extended polyurethane elastomer as a fine dispersion which renders the modified polyurethane elastomer composition melt-free under conditions of high shear.

2. A modified polyurethane elastomer composition in accordance with claim 1 wherein said prepolymer is an isocyanate terminated linear polyether.

3. A modified polyurethane elastomer in accordance with claim 1 wherein said prepolymer is an isocyanate terminated linear polyester.

4. A modified polyurethane elastomer in accordance with claim 1 wherein said hydrocarbon rubber is natural rubber.

5. A modified polyurethane elastomer in accordance with claim 1 wherein said hydrocarbon rubber is polybutadiene.

6. A modified polyurethane elastomer in accordance with claim 1 wherein said hydrocarbon rubber is butadiene/styrene copolymer.

7. A modified polyurethane elastomer in accordance with claim 1 wherein said curing agent for said prepolymer is a diol.

8. A modified polyurethane elastomer in accordance with claim 1 wherein said curing agent for said prepolymer is a diamine.

9. A modified polyurethane elastomer in accordance with claim 1 wherein said curing agent for said hydrocarbon rubber is a sulfur vulcanizing agent.

10. A modified polyurethane elastomer in accordance with claim 1 wherein said curing agent for said hydrocarbon rubber is a peroxy compound.

11. A modified polyurethane elastomer in accordance with claim 10 wherein said peroxy compound is 2,5-dimethyl-2,5-di(t-butyl peroxy) hexyne-3.

12. A modified polyurethane elastomer in accordance with claim 10 wherein said peroxide is 2,5-dimethyl-2,5-di(t-butyl peroxy)-hexane.

13. A modified polyurethane elastomer in accordance with claim 1 wherein said prepolymer is an isocyanate terminated poly (tetrahydrofuran).

14. A modified polyurethane elastomer in accordance with claim 1 wherein said prepolymer is an isocyanate terminated poly(caprolactone).

15. A modified polyurethane elastomer in accordance with claim 1 wherein said isocyanate endings are derived from an aryl diisocyanate.

16. A modified polyurethane elastomer in accordance with claim 15 wherein said diisocyanate is toluene diisocyanate.

17. A modified polyurethane elastomer in accordance with claim 1 wherein said curing agent for said prepolymer is monoethanolamine.

18. A modified polyurethane elastomer tire composition consisting essentially of:
   A. from about 95% to about 65% by weight of said modified polyurethane elastomer composition of a polyurethane formable from;
      a. an isocyanate terminated linear polyether or linear polyester prepolymer having a molecular weight in the range of from 500 to 5000 and an NCO content of from 1% to 10% by weight; and
      b. an isocyanate curing agent for said prepolymer, said curing agent being present in a molar ratio of $XH_n/NCO$ wherein X is oxygen or nitrogen and n is 1 or 2 in the range of from about 1.0 to about 1.2;
   B. from about 5% to about 35% by weight of said modified polyurethane elastomer composition of a rubber material dispersed in said prepolymer and isocyanate curing agent therefor, said rubber material being formable from;
      a. a hydrocarbon rubber free of functionality other than unsaturation and having a molecular weight in the range of from 20,000 to 300,000; and
      b. from 0.01 to 50 parts by weight of the hydrocarbon rubber of a separate and different rubber curing agent for said hydrocarbon rubber;
   C. said modified polyurethane elastomer composition being sufficiently liquid for use in liquid tire fabricating techniques and, after curing, melt-free under abrasive conditions.

* * * * *